United States Patent
Schweid et al.

(10) Patent No.: US 7,120,314 B2
(45) Date of Patent: Oct. 10, 2006

(54) SYSTEMS AND METHODS FOR OBTAINING IMAGE SHEAR AND SKEW

(75) Inventors: Stuart A. Schweid, Pittsford, NY (US); Ramesh Nagarajan, Pittsford, NY (US); Roger L. Triplett, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 806 days.

(21) Appl. No.: 10/342,357

(22) Filed: Jan. 15, 2003

(65) Prior Publication Data

US 2004/0136607 A1 Jul. 15, 2004

(51) Int. Cl.
*G06K 9/36* (2006.01)
*H04N 1/04* (2006.01)
*G06K 9/20* (2006.01)

(52) U.S. Cl. .................. 382/289; 382/295; 358/488

(58) Field of Classification Search ............... 382/293, 382/295, 296, 298, 276, 285, 287, 289, 290, 382/291, 312; 358/497, 493, 488, 474; 345/648, 345/649, 651, 659, 660, 672; 355/25, 82
See application file for complete search history.

(56) References Cited

U.S. PATENT DOCUMENTS

| | | | | |
|---|---|---|---|---|
| 5,715,385 A | * | 2/1998 | Stearns et al. ............. 345/648 |
| 5,764,383 A | * | 6/1998 | Saund et al. ................ 358/497 |
| 6,381,375 B1 | * | 4/2002 | Reyzin ....................... 382/276 |
| 6,421,458 B1 | * | 7/2002 | Michael et al. ............. 382/151 |
| 6,430,320 B1 | * | 8/2002 | Jia et al. ..................... 382/289 |
| 2005/0180632 A1 | * | 8/2005 | Aradhye et al. ............ 382/182 |

\* cited by examiner

*Primary Examiner*—Yon J. Couso
(74) *Attorney, Agent, or Firm*—Oliff & Berridge, PLC; Eugene Palazzo

(57) ABSTRACT

In a machine-fed scanner, orientation angles of edges of an image bearing substrate are obtained and used to calculate image shear and/or skew. A running weighted average of the image skew may be kept in a memory. When a skew value is obtained for a given image, it may be determined whether the skew value is within a predetermined range. If the skew value is within the predetermined range, the skew value is used to determine an image revision to compensate for the skew, and the skew value is incorporated into the running weighted average skew. If the skew value is not within the predetermined range, it is discarded and the running weighted average skew is used to determine an appropriate image skew revision. The running weighted average of the shear may also be kept in a memory. A shear value is obtained for each image, and incorporated into the running weighted average shear. Shear revision is performed based on the running weighted average shear. A determination may be made whether the shear value for a current image is within a predetermined range, and the running weighted average shear may be updated based on the shear value for the current image if the shear value for the current image is within the predetermined range.

21 Claims, 3 Drawing Sheets

SYSTEMS AND METHODS FOR OBTAINING IMAGE SHEAR AND SKEW

BACKGROUND OF THE INVENTION

1. Field of Invention

This invention relates to obtaining image shear and/or skew values for performing image revisions.

2. Description of Related Art

An affine transformation is a transformation which preserves the parallelism of lines in input and output images. One application of affine transformations is in image input operations, such as scanning operations. Specifically, image input systems may have slight imperfections which result in a slight errors in the input image.

FIG. 1 shows an original image 12 on an image bearing substrate 10. When the image 12 is scanned by a scanner of the type which transports the substrate 10 past a scan head, the scanner may impart shear and/or skew to the scanned representation of the image. "Shear" is a location dependent shifting of an image which results from non-perpendicularity of the motion of a substrate relative to device such as a scan head. As shown in FIG. 2, this results in an image 12 that is distorted, compared to the original image 12 in FIG. 1. Thus, a distorted image 12 is subsequently output by being printed on a substrate 20, displayed on a screen, and/or the like.

Shear may be caused by, for example, an error in the alignment of a scan head with respect to a document feeder chassis, an error in the alignment of a paper drive shaft relative to the document feeder chassis, or the like.

"Skew" refers to an accidental, usually slight, rotation of an image that occurs due to rotation of an image bearing substrate relative to a device such as a scan head. Most document feeders in scanners and copiers, especially high-speed document feeders, are susceptible to at least some degree of skew. As shown in FIG. 3, skew results in an image 12 that is slightly rotated, compared to the original image 12 shown in FIG. 1. Thus, a slightly rotated image is subsequently output by being printed on a substrate 20, displayed on a screen, and/or the like.

SUMMARY OF THE INVENTION

When both shear and skew are to be detected for performing an affine transformation, the step of detecting the image skew value may include obtaining orientation angles of a plurality of edges of an image bearing substrate with respect to an axis of an image processing system, and the step of detecting the image shear value may include using at least some of the orientation angles that were obtained for detecting the image skew value. For example, respective orientation angles of leading, trailing, right and left edges of an image bearing substrate may be obtained with respect to an axis of the image processing system. Detecting the image shear value may include determining an angle differential of the leading and/or trailing edges with the right and/or left edges. Preferably, the angle differential of both the leading and trailing edges with both the right and left edges is detected, e.g., the difference between the average angle of the leading and trailing edges and the average angle of the right and left edges is detected, thereby providing better accuracy.

A running weighted average of the skew may be kept in a memory. When a skew value is obtained for a given image, it may be determined whether the skew value is within a predetermined range. If the skew value is within the predetermined range, the skew value is used to determine an image revision to compensate for the skew, and the skew value is incorporated into the running weighted average. If the skew value is not within the predetermined range, it is discarded and the running weighted average is used to determine an appropriate image skew revision.

A running weighted average of the shear may also be kept in a memory. A shear value may be obtained for each image, and incorporated into the running weighted average. Shear revision may be performed based on the running weighted average.

These and other objects, advantages and salient features of the invention are described in or apparent from the following description of exemplary embodiments.

BRIEF DESCRIPTION OF THE DRAWINGS

Exemplary embodiments of the invention will be described with reference to the drawings, wherein like numerals represent like parts, and wherein.

DETAILED DESCRIPTION OF PREFERRED EMBODIMENTS

A running weighted average of the image skew detected for each analyzed substrate, e.g., each analyzed page, is maintained. A running weighted average of the image shear detected for each analyzed substrate is also maintained. These running weighted averages may be used to implement image revisions that are more reliable than image revisions that are performed based on set, static default values for image shear and image skew.

Figure 4:
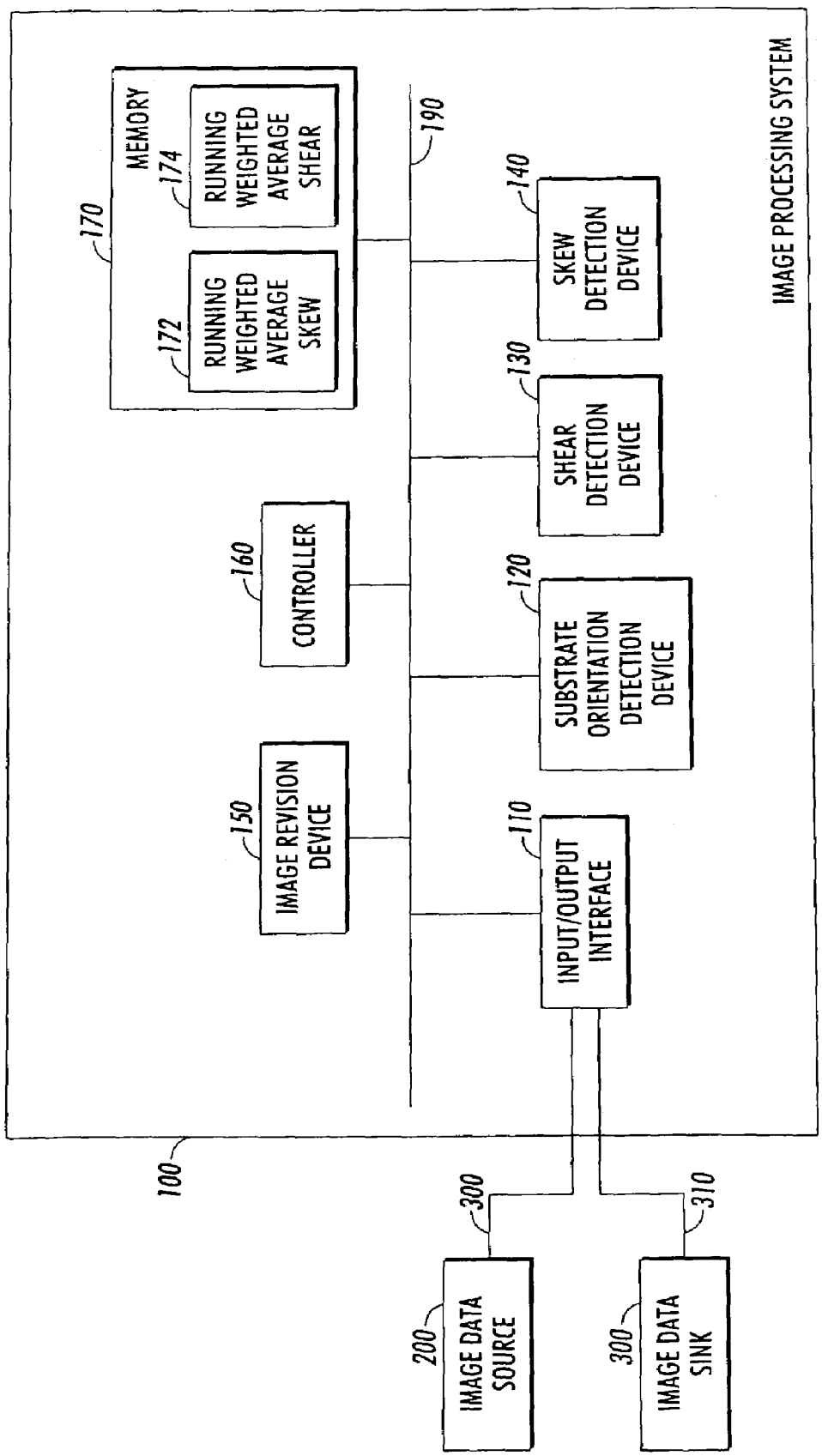
FIG. 4 is a functional block diagram illustrating an exemplary embodiment of an image processing system according to the invention.

FIG. 4 is a functional block diagram illustrating an exemplary embodiment of an image processing system 100 according to the invention. An input/output interface 110 of the image processing system 100 is connected to an image data source 200 via a link 210, and to an image data sink 300 via a link 310.

The image data source 200 typically is or includes a scanner of the type that transports an image-bearing substrate past a scan head. However, the image data source 200 also may be or include any other known or later developed image input device that potentially introduces shear and/or skew into an image. The image data source 200 can be integrated with the image processing system 100, as in a digital copier having an integrated scanner. Alternatively, the image data source 200 can be connected to the image processing system 100 over a connection device, such as a direct wire connection, a modem, a local area network, a wide area network, an intranet, the Internet, any other distributed processing network, or any other known or later developed connection device.

The image data sink 300 can be any device that is capable of outputting or storing the processed data generated by the image processing system 100, such as a printer, a copier or other image forming devices, a facsimile device, a display device, a memory, or the like.

The links 210 and 310 can be a direct link, or a wired, wireless or optical link to a network (not shown). The network can be a local area network, a wide area network, an intranet, the Internet, or any other distributed processing and storage network.

The image processing system 100 includes a substrate orientation detection device 120, a shear detection device 130, a skew detection device 140, an image revision device 150, a controller 160 and a memory 170, which are interconnected via a data/control bus 190.

The substrate orientation detection device 120 may be any known or later developed device that obtains the orientation of an image bearing substrate. In embodiments, the substrate orientation detection device 120 obtains angles of edges of the substrate with respect to an axis of the processing system, such as an axis of a scan head, and thus includes or is connected to sensors (not shown) for detecting the substrate edges. Such devices for obtaining angles of substrate edges are known in the art.

The shear detection device 130 obtains an image shear value based on the substrate orientation information obtained by the substrate orientation detection device 120, and uses the obtained value to update a running weighted average shear stored in the memory 170. The determination and use of the running weighted average shear are described in detail below.

Although shear varies from system to system, the mechanical properties of the system that cause shear are relatively unchanging over time. Therefore, the shear introduced into images by a given system is very similar from image to image. Accordingly, once the average shear imparted to images by a given system is known, that average shear may be used to determine an appropriate revision to be applied to the image through image processing.

There will typically be noise included in the edge angle measurements obtained by the substrate orientation detection device 120, due, e.g., to edge raggedness of the paper, finite sample points, video noise, and/or paper noise. Therefore, if edge angle measurements of a given substrate bearing an image are used to calculate an image revision for that image, the calculated revision may not be entirely accurate or appropriate. Additionally, the substrate orientation detection device 120 may sometimes totally fail to detect an edge. For example, if the image has no margin, but runs right up to the edge of the image bearing substrate, the substrate orientation detection device 120 may fail to detect the edge.

Accordingly, in preferred embodiments, edge angle measurements of a given substrate bearing an image are not directly used to calculate an image shear revision for that image. Rather, the edge angle measurements are used to obtain an image shear value that is incorporated into a running weighted average shear of images that have been processed by the image processing system 100, and this running weighted average is used to determine an appropriate shear revision.

In order for the running weighted average shear to form an accurate basis for determining a shear revision, two assumptions are made. First, it is assumed that there is no differential bias, e.g., that there is no bias in the left and right edge angles that is different from a bias in the leading and trailing edge angles. There may be a bias in all measurements without causing a problem in the shear detection, as long as the bias is the same. It should be noted, however, that any bias would cause problems with skew calculations, and would need to be addressed separately.

Second, it is assumed that the noise appearing in the edge angle measurements is independent from one substrate to the next, i.e., that the noise related to one substrate has nothing to do with the noise related to the previous substrate.

If the actual image shear value is within a predetermined range, then the actual image shear value is used to update the running weighted average shear. An example of an acceptable range might be a shear angle range of −2 to +2 milliradians. The running weighted average shear can be updated over time by, for example, the following equation:

$$\mu_{shear}(k+1) = \alpha \mu_{shear}(k) + (1-\alpha)\ ((\theta_{leading} + \theta_{trailing})/2 - (\theta_{left} + \theta_{right} - 180)/2)$$

where $\mu_{shear}$ (k) is an estimate of shear for a kth image substrate, $\mu_{shear}$ (0) is an initial estimate of shear, $\alpha$ is a weighting, $\theta_{leading}$ is an orientation angle of the leading edge of the image bearing substrate with respect to the axis of the system, $\theta_{trailing}$ is an orientation angle of the trailing edge of the image bearing substrate with respect to the axis of the system, $\theta_{left}$ is an orientation angle of the left edge of the image bearing substrate with respect to the axis of the system, and $\theta_{right}$ is an orientation angle of the right edge of the image bearing substrate with respect to the axis of the system.

The initial estimate of the shear is typically zero. The weighting $\alpha$ is a number less than one, preferably only slightly less than one, such as 0.99. In order to have fast learning, the weighting $\alpha$ can be dynamic, such as:

$$\alpha = \min(0.99, 1-1/(k+1)).$$

The running weighted average shear determined as described above, or by any other suitable formula, is maintained in a running weighted average shear portion 174 of the memory 170. It will be appreciated that, when many images have been analyzed, it makes negligible difference whether the running weighted average shear is updated before or after a given image has been revised for shear.

The skew detection device 140 obtains an image skew value based on the substrate orientation information obtained by the substrate orientation detection device 120, and uses the obtained value to update a default skew stored in the memory 170. The determination and use of the default skew is described in detail below.

In contrast to shear, skew typically does not stay constant over time. Therefore, it is preferable to use the actual skew value obtained for a given image to determine an appropriate skew revision for that image. However, there are cases in which a reliable skew value cannot be determined for a given image. In these cases, a default skew value may be used.

To make the default value more accurate, the image processing system 100 maintains a default skew based on a running weighted average skew, and uses the current value stored for the default skew if it is determined that the actual skew value is not reliable.

Accordingly, when the skew detection device 140 obtains an actual image skew value, it is determined whether this value is within a predetermined range of values. The predetermined range may be set as appropriate for a given printer. One example of an acceptable range might be a skew angle range of −15 to +15 milliradians. The determination of whether the image skew value is within the predetermined range may be made by the skew detection device 140 itself, by the image revision device 150, or by the controller 160.

If the image skew value is within the predetermined range, it is used as a basis for image revision by the image revision device 150, as described below, and is also used to update a default skew value stored in a default skew location 172 of the memory 170.

The image revision device 150 implements appropriate image revisions to an image based on the image shear value and the image skew value. As described above, the determined shear value of a current image is not used to determine a revision—rather, the running weighted average shear is used for this purpose. Therefore, to revise for shear, the image revision device 150 obtains the current value of $\mu_{shear}$ stored in the running weighted average shear portion 174 of the memory 170, and determines an appropriate image revision based on this value. For example, an affine transformation to apply an appropriate revision may be given as:

$$\begin{bmatrix} x \\ y \end{bmatrix} = \begin{bmatrix} 1 & -\mu shear/2 \\ -\mu shear/2 & 1 \end{bmatrix} \begin{bmatrix} x \\ y \end{bmatrix}$$

where x represents the pixel location in the fast scan direction and y represents the scan line number in the slow scan direction.

To revise the image for skew, the image revision device 150 determines an appropriate revision based on the actual skew detected for that image if the actual image skew is within the predetermined range as described above. Otherwise, the image revision device 150 retrieves the current value of the running weighted average skew from the running weighted average skew location 172 of the memory 170, and determines an appropriate revision based on the default skew.

Additionally, if the actual image skew value is within the predetermined range, then the actual image skew value is used to update the running weighted average skew. The update calculation may be given by, for example:

$$\mu_{skew}(k+1)=\alpha\mu_{skew}(k)+(1-\alpha)\ ((\theta_{left}+\theta_{right}+\theta_{leading}+\theta_{trailing}-180\ )/4)$$

where $\mu_{skew}$ (k) is an estimate of skew for a kth image substrate, $\mu_{skew}$ (0) is an initial estimate of skew, $\alpha$ is a weighting, $\theta_{leading}$ is an orientation angle of the leading edge of the image bearing substrate with respect to the axis of the system, $\theta_{trailing}$ is an orientation angle of the trailing edge of the image bearing substrate with respect to the axis of the system, $\theta_{left}$ is an orientation angle of the left edge of the image bearing substrate with respect to the axis of the system, and $\theta_{right}$ is an orientation angle of the right edge of the image bearing substrate with respect to the axis of the system.

The initial estimate of the skew is typically zero. The weighting $\alpha$ is a number less than one, preferably only slightly less than one, such as 0.99. In order to have fast learning, the weighting $\alpha$ can be dynamic, such as:

$$\alpha=\min(0.99,\ 1-1/(k+1)).$$

It will be appreciated that, while the running weighted average skew will be quite reliable over the long term, it will be less reliable in the early stages of use, i.e., before an adequate number of images have been analyzed to provide a good statistical base. Therefore, in the early stages of use, a factory-set default or the like may be used as the running weighted average skew value, based on, for example, actual pre-testing of each system or on historical data of like systems. A skew value of 0 is typically used as an initial value.

When an appropriate skew value has been obtained, the image revision device 150 determines an appropriate skew revision, e.g., by simply taking the opposite of the obtained skew value, and revises the image through image processing according to known techniques.

Since shear and skew are influenced by the condition of the substrate transport system, e.g., by the condition of paper feed rollers or the like, the shear and skew algorithms should be restarted if the substrate transport system is altered by, e.g., replacing feed rollers or the like. Furthermore, if the system includes document input trays that have components, e.g., feed rollers, that form part of the actual substrate transport system when installed, then the shear and skew algorithms may need to be restarted whenever the input trays are changed.

As described above, an analysis may be performed for each image shear value to determine whether it is within a predetermined range. This is preferred. However, in some embodiments, it may be acceptable to simply use every image shear value detected to update the running weighted average shear, without analyzing each shear value to determine whether it is within a predetermined range.

It should be appreciated that the same set of edge angle measurements may be used for both the skew revision determination and the shear revision determination.

By performing the above-described operations, the image revision device 150 can automatically determine shear and/or skew revisions, without user intervention.

The controller 160 controls the operation of other components of the image processing system 100, performs any necessary calculations and executes any necessary programs for implementing the processes of the image processing system 100 and its individual components, and controls the flow of data to and from other components of the image processing system 100 as needed.

The memory 170 may serve as a buffer for information coming into or going out of the image processing system 100, may store any necessary programs and/or data for implementing the functions of the image processing system 100, and/or may store data at various stages of processing. The memory 170 includes a default skew storage location 172 and a running weighted average shear storage location 174, as described above. The memory 170 may also include a separate storage location (not shown) for average skew, when average skew and default skew are maintained separately as described within the examples given above.

Furthermore, it should be appreciated that the memory 170, while depicted as a single entity, may actually be distributed, including separate portions outside and/or inside the image processing system 100. For example, one or more of the substrate orientation detection device 120, the shear detection device 130, the skew detection device 140 and the image revision device 150 may have its own memory.

Alterable portions of the memory 170 are, in various exemplary embodiments, implemented using static or dynamic RAM. However, the memory 170 can also be implemented using a floppy disk and disk drive, a writeable optical disk and disk drive, a hard drive, flash memory or the like. The generally static portions of the memory 170 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

It should be understood that each of the circuits shown in FIG. 4 can be implemented as portions of a suitably programmed general purpose computer. Alternatively, each of the circuits shown in FIG. 4 can be implemented as physically distinct hardware circuits within an ASIC, or using a FPGA, a PDL, a PLA or a PAL, or using discrete logic elements or discrete circuit elements. The particular form each of the circuits shown in FIG. 4 will take is a design choice and will be obvious and predictable to those skilled in the art.

Figure 5:
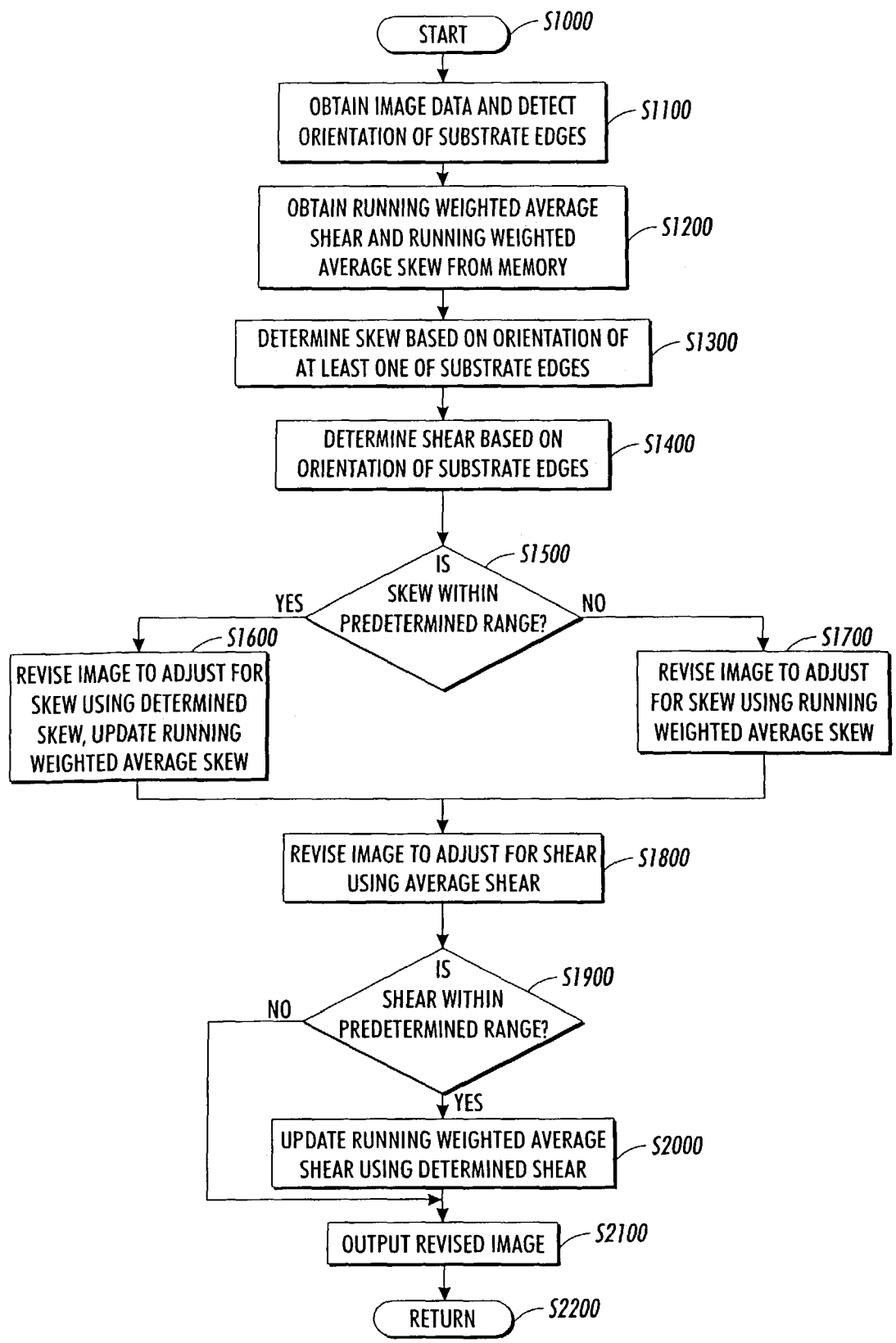
FIG. 5 is a flowchart illustrating an exemplary method of processing an image according to this invention.

FIG. 5 is a flowchart illustrating an exemplary method of processing an image according to this invention. Beginning in step S1000, the process continues to step S1100, where image data of an image is obtained and the orientations of one or more edges of an image bearing substrate bearing the image are detected. At least one edge, typically the leading edge, is used, and more than one edge will be used if both shear and skew revisions are to be performed. The process then continues to step S1200.

In step S1200, a running weighted average shear value and a running weighted average skew value are obtained from memory. The process continues to step S1300 and determines the skew of the image based on the orientation of one or more of the edge orientations detected in step S1600. The process continues to step S1400 and determines the shear of the image based on the edge orientations detected in step S1100. The process then continues to step S1500.

In step S1500, a determination is made whether the skew determined in step S1300 is within a predetermined range. If the skew is within the predetermined range, the process continues to step S1600. Otherwise, the process jumps to step S1700.

In step S1600, the image is revised to adjust for skew using the skew determined in step S1300. The process then continues to step S1800.

In step S1700, the image is revised to adjust for skew using the running weighted average skew obtained in step S1200. The process then continues to step S1800.

In step S1800, the image is revised to adjust for shear using the average shear obtained in step S1200. The process continues to step S1900, where it is determined whether the shear determined in S1400 is within a predetermined range. If the determined shear is within the predetermined range, the process continues to step S2000. Otherwise, the process jumps to step S2100.

In step S2000, the running weighted average shear is updated using the shear determined in step S1400, and the updated value replaces the previous value in the memory. The process then continues to step S2100, where the revised image is output, and then continues to step S2200 and returns. The process is then repeated for the next image.

It should be appreciated that the steps of the process are not limited to the order shown and described. For example, the average shear may be obtained after step S1300, step S1400, step S1500, step S1600 and/or step S1500, or during step S1800. The average skew may be obtained after step S1300, step S1400 and/or step S1500. As other examples, the order of determining skew and shear may be reversed, and the order of revising for skew and shear may be reversed. It should also be appreciated that one or more steps may be omitted depending on circumstances. For example, in some embodiments, only skew may be detected/revised for, and in some embodiments, only shear may be detected/revised for. In such embodiments, various ones of the steps shown and described in connection with FIG. 5, or portions of various ones of the steps, will clearly not be performed.

Figure 1:
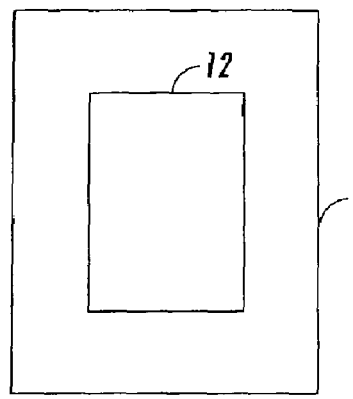
FIG. 1 shows an original image on a substrate.
Figure 2:
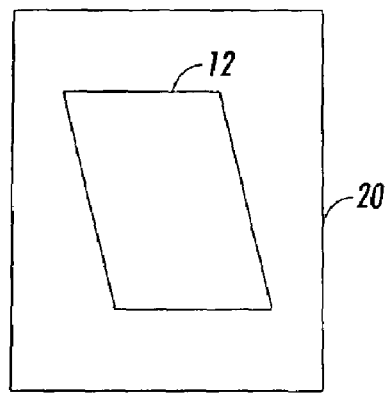
FIG. 2 shows an example of image shear.
Figure 3:
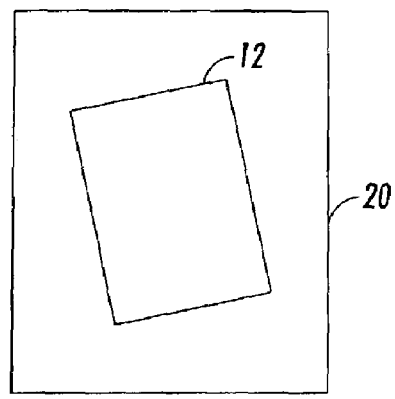
FIG. 3 shows an example of image skew.

The image processing system 100 of FIG. 1 is preferably implemented on a programmed general purpose computer. However, the image processing system 100 can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 5, or appropriate portions thereof, can be used to implement the image processing device according to this invention.

Furthermore, the disclosed methods may be readily implemented in software using object or object-oriented software development environments that provide portable source code that can be used on a variety of computer or workstation hardware platforms. Alternatively, appropriate portions of the disclosed image processing system 100 may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer or as a resource residing on a server or workstation, such as a routine embedded in a photocopier, a color photocopier, a printer driver, a scanner, or the like. The systems and methods can also be implemented by physical incorporation into a software and/or hardware system, such as the hardware and software system of a photocopier or a dedicated image processing system.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

For example, while the foregoing description has been primarily intended for application to scanning systems, principles of the invention may apply to detecting/revising for skew and/or shear in marking systems, such as printers, and such applications are considered to be within the spirit and scope of the invention. Those skilled in the art will appreciate that, for application in marking systems, a scan head would need to be present in the system, positioned downstream of the marking head, to detect the shear and/or skew of the marked image and feed back this information upstream of the marking head. The fed-back information could then be used to revise the image data for subsequently marked images.

What is claimed is:

1. A method of performing an affine transformation including at least one of a shear revision and a skew revision in an image processing system that processes an image, the method comprising:

obtaining at least one of an image shear value and an image skew value from a scanned image;

determining whether the at least one of the image shear value and the image skew value is within a predetermined range;

retrieving at least one of a weighted average shear value and a weighted average skew value from a memory device;

updating the at least one of the weighted average shear value and the weighted average skew value based on the at least one of the image shear value and the image skew value if the at least one of the image shear value and the image skew value is within a predetermined range; and storing the updated at least one of the weighted average shear value and the weighted average skew value in the memory device.

2. The method of claim 1, wherein the step of obtaining includes both obtaining the image skew value and obtaining the image shear value.

3. The method of claim 2, wherein the step of updating includes updating both the weighted average shear value and the weighted average skew value based on the image shear value and the image skew value, respectively, if both the image shear value and the image skew value are within respective predetermined ranges.

4. The method of claim 1, wherein, when the step of obtaining includes obtaining the image skew value, the method further comprises:

automatically revising the image based on the image skew value if the image skew value is within the predetermined range; and automatically revising the image based on the weighted average skew value if the image skew value is not within the predetermined range.

5. The method of claim 1, wherein, when the step of obtaining includes obtaining the image shear value, the method further comprises:

automatically revising the image based on the weighted average shear value.

6. The method of claim 1, wherein:

the step of obtaining includes both obtaining the image skew value and obtaining the image shear values;

wherein the step of obtaining the image skew value comprises obtaining orientation angles of a plurality of edges of an image bearing substrate with respect to an axis of the image processing systems; and wherein the step of obtaining the image shear value comprises using at least some of the orientation angles that were obtained for obtaining the image skew value.

7. The method of claim 1, wherein, when the step of obtaining includes obtaining the image shear value, the step of obtaining the image shear value comprises:

obtaining respective orientation angles of leading, trailing, right and left edges of an image bearing substrate with respect to an axis of the image processing system; and determining the image shear value based on the respective orientation angles of the leading, trailing, right and left edges.

8. The method of claim 7, wherein the step of determining the image shear value comprises determining an angle differential of the leading and/or trailing edges with the right and/or left edges.

9. The method according to claim 1, wherein the image processing system comprises a scanner and the method is performed in the scanner.

10. A system that performs an affine transformation including at least one of a shear revision and a skew revision in an image processing system that processes an image, the system comprising:

a shear detection device that obtains an image shear value and determines whether the image shear value is within a predetermined range;

a skew detection device that obtains an image skew value and determines whether the image skew value is within a predetermined range; and a controller that:

obtains at least one of a weighted average shear value and a weighted average skew value from a memory device;

updates the weighted average shear value based on the image shear value, if the image shear value is within a predetermined range and stores the updated weighted average shear value in the memory device; and updates the weighted average skew value based on the image skew value, if the image skew value is within a predetermined range and stores the updated weighted average skew value in the memory device.

11. The system of claim 10, wherein the controller obtains both the image skew value and the image shear value.

12. The system of claim 11, wherein the controller updates both the weighted average shear value and the weighted average skew value based on the image shear value and the image skew value, respectively, if both the image shear value and the image skew value are within respective predetermined ranges.

13. The system of claim 10, further comprising:

an image revision device that automatically revises the image based on the image skew value if the image skew value is within the predetermined range and automatically revises the image based on the weighted average skew value if the image skew value is not within the predetermined range.

14. The system of claim 10, further comprising:

an image revision device that automatically revises the image based on the weighted average shear value.

15. The system of claim 10, wherein:

the skew detection device obtains the image skew value based on orientation angles of a plurality of edges of an image bearing substrate with respect to an axis of the image processing system; and the shear detection device obtains the image shear value using at least some of the orientation angles.

16. The system of claim 10, wherein, in obtaining the image shear value, the shear detection device obtains respective orientation angles of leading, trailing, right and left edges of an image bearing substrate with respect to an axis of the image processing system and determines the image shear value based on the respective orientation angles of the leading, trailing, right and left edges.

17. The system of claim 16, wherein, in obtaining the image shear value, the shear detection device further:

determines an angle differential of the leading and/or trailing edges with the right and/or left edges.

18. A document processing device incorporating the system according to claim 10.

19. The document processing device of claim 18, wherein the document processing device is a scanner.

20. The document processing device of claim 18, wherein the document processing device is a digital photocopier.

21. A computer-readable medium on which is recorded a computer program for implementing the method of claim 1.

* * * * *